Patented Aug. 31, 1948

2,448,211

UNITED STATES PATENT OFFICE 2,448,211

ALKYLATION OF THIOPHENE

Philip D. Caesar, Wenonah, and Alexander N. Sachanen, Woodbury, N. J., assignors to Socony-Vacuum Oil Company, Incorporated, a corporation of New York No Drawing. Application February 10, 1944, Serial No. 521,866

32 Claims. (Cl. 260—329)

This invention relates generally to the synthesis of the homologues of thiophene and of its derivatives, and is more particularly concerned with a process for alkylating thiophene and its derivatives, in the presence of catalytic material.

Alkylation is a well known reaction in the art, and connotes the union between molecules of olefinic hydrocarbons and molecules of paraffinic hydrocarbons or cyclic hydrocarbons, to produce compounds, called alkymers, which represent, structurally, the addition of the original hydrocarbon molecules. The product of an alkylation reaction is broadly referred to in the art, as an alkylate and the conditions of temperature, pressure, etc., are called alkylating conditions. Since alkylating conditions also cause polymerization of the olefinic reactant, in alkylation operations, it is necessary, ordinarily, to maintain a relatively low concentration of the olefinic reactant in the charge.

As is well known to those familiar with the art, alkylation reactants may be effected at relatively high temperatures and pressures, or may be carried out at lower temperatures and pressures, in the presence of substances or mixtures of substances that facilitate the alkylation reaction. These substances are referred to in the art, as alkylation catalysts. Accordingly, the operation embodying the use of alkylation catalysts for effecting alkylation reactions, is known as catalytic alkylation, as distinguished from the operation wherein no alkylation catalysts are employed, and which is referred to as thermal alkylation.

As is well known in the art, the synthesis of the homologues of thiophene, has been effected mostly through the Wurtz reaction, i. e., by condensing the iodo derivatives of thiophene, with iodo- or bromo-alkyls in the presence of metallic sodium. However, the yields of thiophene homologues have been always small and the cost of the reagents involved have limited somewhat, commercial utilization of this synthesis. The Friedel-Crafts synthesis has also been proposed for preparing thiophene homologues, i. e., the condensation of thiophene and halogen alkyls in the presence of aluminum chloride. This reaction, although applicable with considerable success in the alkylation of aromatic hydrocarbons, is only moderately successful where thiophene is involved. This appears to be due to the relative instability of the thiophene ring, the aluminum chloride attacking the sulfur and causing many undesirable secondary reactions with concomitantly low yields of alkyl thiophenes. In fact, the major problem encountered in attempting to alkylate thiophene is the ease with which thiophene and its derivatives polymerize. Consequently, while under many conditions some alkylation of the thiophene can be obtained at the same time the major portion of the thiophene is polymerized.

We have discovered that the homologues of thiophene or of thiophene derivatives may be obtained in an efficient manner, by reacting thiophene or thiophene derivatives with olefinic hydrocarbons, under alkylating conditions and in the presence of activated natural clay catalysts or of synthetic catalysts containing silica and at least one amphoteric metal oxide.

We have found that the proportion of the thiophene or thiophene derivative and the olefinic reactant in the charge, determines the extent of alkylation effected; hence, the concentration of the olefinic reactant in the charge is controlled by the nature of the product desired.

It is an object of the present invention to provide an efficient process for synthesizing the homologues of thiophene and of its derivatives. Another object is to provide a process for alkylating thiophene and its derivatives. A further object is to afford a process for catalytically alkylating thiophene and its derivatives. A more specific object is to provide a process for alkylating thiophene and its derivatives with olefinic hydrocarbons. A very important object is to afford a process capable of carrying out the above objects by reacting thiophene or thiophene derivatives with olefinic hydrocarbons, under alkylating conditions and in the presence of activated natural clay catalysts or of synthetic catalysts containing silica and at least one amphoteric metal oxide. Other objects and advantages of the present invention will become apparent to those skilled in the art from the following description.

Broadly stated, the present invention provides a process for alkylating thiophene or thiophene derivatives, which comprises contacting thiophene or a thiophene derivative with an olefinic hydrocarbon, in a reaction zone under alkylating conditions, in the presence of catalytic material including either an activated natural clay or a synthetic adsorbent composite of silica and at least one amphoteric metal oxide. The formation of the alkymers obtained in accordance with the process of the present invention, may be postulated to proceed as follows:

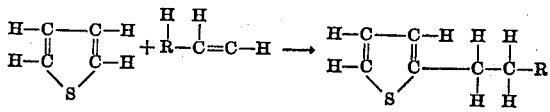

where R represents one or more straight chain carbon atoms or cyclic groups.

A feature of the process of our invention, is that the alkylating conditions are somewhat moderate. In other words, the contact time is the maximum at which no substantial polymerization occurs. As a result, degradation of the reactants in the charge and the pronounced occurrence of secondary reactions, including polymerization of the olefinic reactant and/or thiophene, are avoided to an appreciable extent. Consequently, in our process, we obtain high yields of alkyl thiophenes.

An important feature of our invention, is the low cost and the ready availability of the olefinic reactants employed. The olefinic hydrocarbons to be used in our process may be derived from any suitable source, as is well known in the art, and may be used either in the pure state or in admixture with other constituents not undesirable. A conventional and preferred source is the fixed gases obtained as by-products of commercial cracking operations, around petroleum refineries. These fixed gases may furnish the bulk of the lighter olefinic hydrocarbons, or it may be necessary or desirable to obtain additional supplies, as is well understood. Additional quantities of the lighter olefinic hydrocarbons, or other and heavier olefinic hydrocarbons may be easily synthesized, if necessary, from the paraffinic hydrocarbons present in the fixed gases referred to hereinbefore, or from other materials, as is well known in the art. Any olefinic hydrocarbon can be used in our process, depending upon the type of alkyl thiophene desired.

It must be understood, however, that high molecular weight olefinic hydrocarbons may be unstable under the alkylating conditions, and may be decomposed into olefinic hydrocarbons of lower molecular weights.

Another important feature of the process of the present invention is the low cost and the nature of the catalytic material employed. We may use activated natural clays or synthetic adsorbent composites of silica and at least one amphoteric metal oxide, as catalysts. We have found, for instance, that the alkylation reaction is materially promoted when it is carried out in the presence of clay catalysts on which zinc chloride, phosphoric acid and the like, had been precipitated. With respect to the synthetic silica-amphoteric metal oxide catalysts, and by way of non-limiting examples, the amphoteric metal oxide may be alumina, zirconia, ceria, thoria and the like. For economy, we prefer a silica-alumina catalyst. Alumina may be partially replaced by one or more of the other metal oxides, and generally speaking, any metal oxide, with the exception of alkali metal oxides, may replace part of the alumina. As is the case with the natural clay catalysts, we have found that the use of small amounts of zinc chloride, phosphoric acid and the like, in conjunction with the synthetic silica-alumina catalysts, may, in some cases, be beneficial. Ordinarily, we use between about 10% and 100% of catalyst, based on the weight of the charge. These catalysts may be regenerated in accordance with conventional methods of regeneration.

A most important feature of our invention is that the extent of alkylation of the thiophene, depends upon the ratio of the amounts of thiophene to olefinic reactant employed in the charge. When an excess of olefinic reactant is used, for example, from 2 to 4 moles per mole of thiophene, dialkyl thiophenes are produced in predominant amounts. On the other hand, when an excess of thiophene is employed in the charge, for example, from 2 to 4 moles per mole of olefinic reactant, the alkylate obtained consists predominantly of monoalkyl thiophenes.

The alkylating conditions of the process of the present invention are, as stated hereinbefore, somewhat moderate. Generally speaking, temperatures varying between about 140° C. and about 400° C., and pressures varying between atmospheric pressure and 1000 pounds per square inch, have been found satisfactory for carrying out our process. We have found that the temperature to be employed depends upon the time of reaction and the nature of the olefinic reactant in the charge. Ordinarily, and in batch operation, lower temperatures are used when the more reactive olefinic hydrocarbons are employed, and high temperatures, when the less reactive olefinic hydrocarbons are used. The most suitable pressure is more or less dependent upon the particular temperature involved, and as a general rule, the higher the temperature, the lower the pressure and the lower the reaction time that may be used. In continuous operation, the temperature and pressure are independent and may be varied at will.

The reaction time depends upon the temperature, the reactivity of the olefinic reactant, and to a certain extent upon the pressure. Accordingly, it may vary between a fraction of a second and several hours. It must be understood, that these reaction variables are more or less interdependent, hence, when one is arbitrarily fixed, the limits within which the others may be varied, are somewhat restricted. In any particular instance, the most desirable conditions can be readily ascertained by one skilled in the art, the preferred ranges of these variables having been indicated hereinbefore.

The following examples are intended to be illustrative only and are not to be considered in any way as limiting the scope of the invention:

EXAMPLE 1

*Alkylation with an excess of olefinic reactant*

24 grams of thiophene, 50 grams of amylene and 25 grams of a synthetic alumina-silica catalyst were placed into an autoclave and stirred for 10 minutes at a temperature of 180° C. and at a pressure of about 150 pounds per square inch. 42 grams of diamylthiophene were produced, representing a 66% yield with respect to the theoretical yield based on the thiophene. The compound had the following physical properties:

Specific gravity=0.917 at 20° C.
Boiling range=250° C.-262° C.
Sulfur content=14.15% (theoretically 14.30%)

EXAMPLE 2

*Alkylation with an excess of thiophene*

100 grams of thiophene, 21 grams of amylene, and 25 grams of a synthetic alumina-silica catalyst, similar to that of Example 1, were placed into an autoclave and stirred for 10 minutes, at temperatures of 155° C., under a pressure of about 60 pounds per square inch. 24 grams of monoamylthiophene and 2 to 4 grams of diamylthiophene were recovered from the product, representing a 60% yield with respect to the theoretical yield based on the thiophene. The monoamylthiophene had the following physical properties:

Specific gravity=0.954 at 20° C.
Boiling range=185° C.–200° C.
Sulfur content=20.5% (theoretically 20.8%)

EXAMPLE 3

15 grams of propylene, 90 grams of thiophene, and 20 grams of a synthetic alumina-silica catalyst upon which 10 per cent of zinc chloride has been precipitated, were placed into an autoclave and stirred for about one hour, at temperatures of 170–180° C., under pressures of 200–500 pounds per square inch. 16 grams of monopropylthiophene and 10 grams of higher molecular weight alkymers were obtained.

The run was repeated with the exception that the synthetic alumina-silica catalyst alone was used. It was found that higher temperatures were necessary to carry out the reaction and that the ensuing more pronounced decomposition of thiophene caused lower yields of alkylate.

EXAMPLE 4

100 grams of a fraction boiling at 70–100° C. from a thermally cracked gasoline, and containing about 80% $C_6$ and $C_7$ olefinic hydrocarbons, 25 grams of thiophene, and 25 grams of a synthetic alumina-silica catalyst, were placed into an autoclave and stirred for 20 minutes, at temperatures of 190–230° C., under pressures of 100–300 pounds per square inch. 30 grams of thiophene alkymers boiling at 60–160° C. at 3 mm. pressure and having an average density of 0.93–0.94, were obtained.

EXAMPLE 5

*Continuous operation*

A mixture comprising 28 parts of thiophene and 9 parts of amylene was charged through a glass tube filled with a synthetic alumina-silica catalyst and immersed in a lead bath kept at a temperature of 263° C., at a rate of one part per minute. 5.4 parts of a liquid boiling above 90° C. and 21 parts of unreacted thiophene were recovered. The liquid was analyzed and was found to consist of the following:

| | Parts |
|---|---|
| Monopropylthiophene ⎫ | 2.7 |
| Monobutylthiophene  ⎬ | |
| Monoamylthiophene | 1.3 |
| Higher alkylated thiophenes | 1.4 |

The liquid product represents a conversion per pass to thiophene alkymers, based on the thiophene consumed, of approximately 50% theoretical.

The present invention may be embodied in other specific forms without departing from the spirit or essential attributes thereof, and it is therefore desired that the present embodiments be considered in all respects as illustrative and not restrictive, reference being had to the appended claims rather than to the foregoing description to indicate the scope of the invention.

We claim:

1. The process for synthesizing the homologues of thiophene which includes contacting thiophene having at least one nuclear hydrogen replaced by an alkyl group with an olefinic hydrocarbon for not more than about one hour in the presence of catalytic material selected from the group consisting of activated natural clays and synthetic adsorbent composites of silica and at least one amphoteric metal oxide at temperatures of about 140° to about 400° C., at pressures of atmospheric to 1000 pounds per square inch, the temperature being higher for less reactive hydrocarbons than for more reactive hydrocarbons and the higher the temperature the lower the pressure and the shorter the reaction time.

2. The process as set forth and described in claim 1 wherein the catalytic material is activated clay.

3. The process as set forth and described in claim 1 wherein the catalytic material comprises a synthetic adsorbent composite of silica and at least one amphoteric metal oxide.

4. The process as set forth and described in claim 1 wherein the catalytic material comprises synthetic alumina-silica catalyst.

5. The process as set forth and described in claim 1 wherein the catalytic material comprises a synthetic alumina-silica catalyst in which the alumina is partially replaced by a different amphoteric metal oxide.

6. The process as set forth and described in claim 1 wherein the catalytic material comprises a synthetic alumina-silica catalyst in which alumina is partially replaced by ceria.

7. The process as set forth and described in claim 1 wherein the catalytic material comprises a synthetic alumina-silica catalyst in which the alumina is partially replaced by thoria.

8. The process as set forth and described in claim 1 wherein the catalytic material comprises a synthetic alumina-silica catalyst in which the alumina is partially replaced by zirconia.

9. The process for alkylating alkyl thiophenes which includes contacting an alkyl thiophene having at least one replaceable nuclear hydrogen with an olefinic hydrocarbon for not more than about one hour in the presence of catalytic material selected from the group consisting of activated natural clays and synthetic adsorbent composites of silica and at least one amphoteric metal oxide at temperatures of about 140° C. to about 400° C., at pressures of atmospheric to 1000 pounds per square inch, the temperature being higher for less reactive hydrocarbons than for more reactive hydrocarbons and the higher the temperature the lower the pressure and the shorter the reaction time to obtain an alkylated thiophene having an alkyl group substituted for said replaceable nuclear hydrogen.

10. The process as set forth and described in claim 9 wherein the catalytic material is activated clay.

11. The process as set forth and described in claim 9 wherein the catalytic material comprises a synthetic adsorbent composite of silica and at least one amphoteric metal oxide.

12. The process as set forth and described in claim 9 wherein the catalytic material comprises synthetic alumina-silica catalyst.

13. The process as set forth and described in claim 9 wherein the catalytic material comprises a synthetic alumina-silica catalyst in which the alumina is partially replaced by a different amphoteric metal oxide.

14. The process as set forth and described in claim 9 wherein the catalytic material comprises a synthetic alumina-silica catalyst in which alumina is partially replaced by ceria.

15. The process as set forth and described in claim 9 wherein the catalytic material comprises a synthetic alumina-silica catalyst in which alumina is partially replaced by thoria.

16. The process as set forth and described in claim 9 wherein the catalytic material comprises a synthetic alumina-silica catalyst in which alumina is partially replaced by zirconia.

17. The process of synthesizing mono-alkyl thiophene, which comprises contacting a mixture containing an olefinic hydrocarbon and thiophene, said thiophene being present in said mixture in excess of molal proportions with respect to said olefinic hydrocarbon, for not more than about one hour with catalytic material selected from the group consisting of activated natural clays and synthetic adsorbent composites of silica and at least one amphoteric metal oxide at temperatures of about 140° C. to about 400° C., at pressures of atmospheric to 1000 pounds per square inch, the temperature being higher for less reactive hydrocarbons than for more reactive hydrocarbons and the higher the temperature the lower the pressure and the shorter the reaction time to obtain an alkylated thiophene having an alkyl group substituted for a nuclear hydrogen.

18. The process as set forth and described in claim 17 wherein the catalytic material is activated clay.

19. The process as set forth and described in claim 17 wherein the catalytic material comprises a synthetic adsorbent composite of silica and at least one amphoteric metal oxide.

20. The process as set forth and described in claim 17 wherein the catalytic material comprises synthetic alumina-silica catalyst.

21. The process as set forth and described in claim 17 wherein the catalytic material comprises a synthetic alumina-silica catalyst in which the alumina is partially replaced by a different amphoteric metal oxide.

22. The process as set forth and described in claim 17 wherein the catalyst material comprises a synthetic alumina-silica catalyst in which alumina is partially replaced by ceria.

23. The process as set forth and described in claim 17 wherein the catalytic material comprises a synthetic alumina-silica catalyst in which alumina is partially replaced by thoria.

24. The process as set forth and described in claim 17 wherein the catalytic material comprises a synthetic alumina-silica catalyst in which alumina is partially replaced by zirconia.

25. The process of synthesizing dialkyl thiophene, which includes contacting a mixture containing thiophene and a molecular excess, with respect to said thiophene, of an olefinic hydrocarbon for not more than one hour with catalytic material selected from the group consisting of activated natural clays and synthetic adsorbent composites of silica and at least one amphoteric metal oxide at temperatures of about 140° C. to about 400° C., at pressures of atmospheric to 1000 pounds per square inch, the temperature being higher for less reactive hydrocarbons than for more reactive hydrocarbons and the higher the temperature the lower the pressure and the shorter the reaction time to obtain alkylated thiophene having alkyl groups substituted for two nuclear hydrogen atoms.

26. The process as set forth and described in claim 25 wherein the catalytic material is activated clay.

27. The process as set forth and described in claim 25 wherein the catalytic material comprises a synthetic adsorbent composite of silica and at least one amphoteric metal oxide.

28. The process as set forth and described in claim 25 wherein the catalytic material comprises synthetic alumina-silica catalyst.

29. The process as set forth and described in claim 25 wherein the catalytic material comprises a synthetic alumina-silica catalyst in which the alumina is partially replaced by a different amphoteric metal oxide.

30. The process as set forth and described in claim 25 wherein the catalytic material comprises a synthetic alumina-silica catalyst in which alumina is partially replaced by ceria.

31. The process as set forth and described in claim 25 wherein the catalytic material comprises a synthetic alumina-silica catalyst in which alumina is partially replaced by thoria.

32. The process as set forth and described in claim 25 wherein the catalytic material comprises a synthetic alumina-silica catalyst in which alumina is partially replaced by zirconia.

PHILIP D. CAESAR.
ALEXANDER N. SACHANEN.

REFERENCES CITED

The following references are of record in the file of this patent:

UNITED STATES PATENTS

| Number | Name | Date |
|---|---|---|
| 2,115,884 | Schollkopf | May 3, 1938 |
| 2,141,611 | Malisheve | Dec. 27, 1938 |
| 2,143,493 | Stanley et al. | Jan. 10, 1939 |
| 2,214,455 | Egloff et al. | Sept. 10, 1940 |
| 2,215,305 | Voorhies | Sept. 17, 1940 |
| 2,259,723 | Ballard et al. | Oct. 21, 1941 |

OTHER REFERENCES

Von Seeman: Can. J. Res., 19–B, pages 291–5. (Cited in 36 Chem. Abs., page 1305; 1942.)

Certificate of Correction

Patent No. 2,448,211.                                                                 August 31, 1948.

PHILIP D. CAESAR ET AL.

It is hereby certified that errors appear in the printed specification of the above numbered patent requiring correction as follows: Column 3, lines 10 to 12 inclusive, for that portion of the formula reading

column 7, line 39, for "siilca" read *silica*; and that the said Letters Patent should be read with these corrections therein that the same may conform to the record of the case in the Patent Office.

Signed and sealed this 30th day of November, A. D. 1948.

[SEAL]

THOMAS F. MURPHY,
*Assistant Commissioner of Patents.*